United States Patent
Reimann

(10) Patent No.: US 12,507,157 B2
(45) Date of Patent: Dec. 23, 2025

(54) METHOD FOR DECIDING THE DISTANCE THRESHOLD FOR A PLURALITY OF TRANSPONDERS

(71) Applicant: LAMBDA:4 ENTWICKLUNGEN GMBH, Hamburg (DE)

(72) Inventor: Rönne Reimann, Hamburg (DE)

(73) Assignee: Lambda:4 Entwicklungen GmbH (DE)

( * ) Notice: Subject to any disclaimer, the term of this patent is extended or adjusted under 35 U.S.C. 154(b) by 563 days.

(21) Appl. No.: 17/921,218

(22) PCT Filed: Nov. 24, 2020

(86) PCT No.: PCT/EP2020/083184
§ 371 (c)(1),
(2) Date: Oct. 25, 2022

(87) PCT Pub. No.: WO2021/239265
PCT Pub. Date: Dec. 2, 2021

(65) Prior Publication Data
US 2024/0284310 A1    Aug. 22, 2024

(30) Foreign Application Priority Data

May 27, 2020 (EP) .................................. 20176953

(51) Int. Cl.
*H04W 48/14* (2009.01)
*G07C 9/00* (2020.01)
(Continued)

(52) U.S. Cl.
CPC ........ *H04W 48/14* (2013.01); *G07C 9/00309* (2013.01); *H04B 17/318* (2015.01);
(Continued)

(58) Field of Classification Search
CPC ................... G01S 11/06; G01S 13/74; G07C 2009/00341; G07C 9/00309;
(Continued)

(56) References Cited

U.S. PATENT DOCUMENTS

| 5,602,538 | A | 2/1997 | Orthmann et al. |
| 2004/0090308 | A1 | 5/2004 | Takahashi et al. |

(Continued)

FOREIGN PATENT DOCUMENTS

DE    102010042302    5/2011

*Primary Examiner* — Zhensheng Zhang
(74) *Attorney, Agent, or Firm* — Sand, Sebolt & Wernow Co., LPA

(57) ABSTRACT

A temporal optimization of a distance threshold decision for a plurality of transponders is disclosed in which it may be determined as rapidly as possible whether at least one of the transponders falls below a preset distance, particularly to a query node. A decision is to be made regarding the release with high probability, particularly in less than 500 ms, even if a plurality of authorized transponders are present in querying range and the necessary measurements and/or calculations are time-intensive. The disclosure introduces an estimation phase occurring before a first phase. In the estimation phase it is initially estimated with high probability which one or several of the transponders are the one or several with the shortest distance(s). Afterwards, the actual distance determination begins and is executed such that initially the distance is determined for at least one of the transponders having the smallest distance with the greatest probability.

21 Claims, 1 Drawing Sheet

(51) Int. Cl.
  *H04B 17/318* (2015.01)
  *H04W 12/06* (2021.01)
  *H04W 56/00* (2009.01)

(52) U.S. Cl.
  CPC ....... *H04W 12/06* (2013.01); *H04W 56/0015* (2013.01); *G07C 2009/00341* (2013.01)

(58) Field of Classification Search
  CPC .... H04B 17/318; H04W 12/06; H04W 48/14; H04W 56/0015
  See application file for complete search history.

(56) References Cited

U.S. PATENT DOCUMENTS

2006/0114100 A1    6/2006  Ghabra et al.
2015/0080043 A1*  3/2015  Wang .................... H04W 48/16
                                                        455/509

* cited by examiner

METHOD FOR DECIDING THE DISTANCE THRESHOLD FOR A PLURALITY OF TRANSPONDERS

TECHNICAL FIELD

The present invention relates to the temporal optimization of a distance threshold decision for a plurality of transponders. In this context, it should be determined as quickly as possible whether at least one of the transponders of the plurality falls below a preset distance, particularly to a query node.

BACKGROUND OF THE INVENTION

Numerous methods for determining the distance between a transponder and a querying antenna are known. Making a release decision on the basis of the distance measurement is also known, for example, to open a door lock or leave it locked.

Reducing the time required for detection in some situations, in that only the most recently detected key is queried is also known, is also known from US 2004/0090308 A1. Querying various regions that are assigned to individual automatic doors using various antennas, and only opening doors the antennas of which have found a key is also known from US 2006/0114100 A1. Moreover, executing a plurality of queries and from the second query, including in the query the respective ID of the strongest response signal to the most recent query, and only having the keys be answered the IDs of which have not yet been included in a query is also known from U.S. Pat. No. 5,602,538 A.

Transmitting query signals from a plurality of antennas in a first phase of the method, and allowing each transponder to respond to each of these query signals, and performing a triangulation on the basis of the received response signals, such as their strength or RSSI, and in a second phase to evaluate the authorization of the transponders localized in preset zones in the first phase is also known from DE102010042302B4. In this context, determining a sequence or a selection of transponders for which an authorization evaluation is to be executed in the second phase is also disclosed.

However, it is desirable to be able to execute the distance threshold decision maximally reliably and rapidly, for example, to be able to quickly open a lock so quickly that in the event of authorized nearing it is opened before a latch can be pressed down, for example. An optimization of the known approach to this effect is the object of this invention. Particularly, a decision on the release should be made with high probability in less than 500 ms, preferably less than 200 ms, even if a plurality of authorized transponders are present in the query range, and the necessary measurements and/or calculations are time-intensive.

SUMMARY OF THE INVENTION

For this purpose, the invention introduces an estimation phase that takes place before the first phase, in which estimation phase it is initially estimated with the greatest probability which transponder(s) is/are the one/those with the shortest distance(s). Such an estimate can rest on simple calculations of the distance, or be given through such a one, particularly through previously known methods that enable a rapid but only imprecise calculation of the distance. An estimate can also be carried out through the signal strength or RSSI, for example.

Only then does the actual distance determination take place, which is carried out such that first the distance of at least one, particularly one, of the transponders that has/have the smallest distance(s) with the greatest probability is determined.

The object is therefore solved by a method and system as outlined in the following.

A method according to the invention for determining at least one distance to at least one transponder of a plurality of transponders, which particularly are implemented as transceivers, has the following steps
- transmitting one, particularly precisely one, first query signal.
  - The first query signal is particularly transmitted by a query node by means of at least one antenna.
  - transmitting one, particularly precisely one, first response signal by at least two of the plurality of transponders.

In this context, particularly each of the transponders of the plurality that receives the first query signal and does not establish by other measures that said query signal does not satisfy requirements known to the transponder transmits a first response signal. Such requirements can be, for example, that the transponder is authorized vis-à-vis the query node has an ID from a certain group or quantity, and/or that the first query signal was received with a sufficient quality or strength. The requirements can arise in relation to the first query signal, values derived therefrom, query signals, responses of other transponders, values thereof therefrom, and/or values stored in the transponder. Their satisfaction can be determined based on the first query signal, values derived therefrom, responses of other transponders, values derived therefrom, and/or values stored in the transponder. The response signals particularly are transmitted sequentially. The sequence can be determined in the first query signal, and/or values derived therefrom, and/or can be derivable or derived therefrom, and/or from values stored in the transponder, and/or responses of other transponders. The first response signals can be respectively transmitted by a plurality of antennas and/or on a plurality of frequencies.

Advantageously, each transponder performs a transmission power or gain adjustment before transmission, particularly based on the received signal strength of the first query signal. Particularly, the transmission power of the given response signal or a value correlating therewith is encoded in the respective first response signal. The values of the gain adjustment, particularly the transmission power, can be used in the known manner for the distance estimate.
- determining a hierarchy of at least one partial quantity of the plurality of transponders on the basis of the response signal, wherein particularly the places of the transponders in the hierarchy is determined on the basis of an estimated distance, or at least one value that can be and/or is used for a distance estimate. Particularly, the places in the hierarchy are, and/or the value that can be used or is used for a distance estimate is, particularly exclusively, derived and/or calculated from the response signals of the respective transponder and/or transponders received at the query node. In this context, the values calculated from the first response signals are particularly compared to one another, and the sequence determined through this comparison. Thus, for example, the signal strength of each first response signal can be determined, and the sequence can be determined based on the signal strength such that the transponder with the greatest signal strength receives the highest/first place, and the other places are assigned by decreasing signal strength.

The value that can be used for a distance estimate is particularly a value that has a direct relationship to the distance, at least in an undisturbed environment with exclusively direct signal propagation and/or without multipathing. Particularly, the relationship can be described mathematically, and/or is constantly rising or constantly falling, so that a higher value is associated with a farther distance or a higher value is associated with a shorter distance. The signal strength or RSSI is conceivable here, for example.

In the formation of the hierarchy, particularly no absolute distance or signal runtime is determined and/or not differentiated whether the first response signal is received impaired due to shielding or distance. Thus a hierarchy of the virtual distance is particularly determined, virtually insofar as the signal change on the transmission path is solely effected through distance filled with air.

For the determination of the hierarchy, successively particularly only a maximum of ten, particularly a maximum of two, particularly a maximum of one, signals) and/or first response signals of each transponder are transmitted and/or taken into account on a plurality of frequencies and/or via a plurality of antennas. In this context, these or this signal can be received via a plurality of antennas of the query node. Thus a plurality of signal components or a plurality of received variants of the signal or of the signal components can also be taken into account. One value is determined and taken into account particularly for each transponder, per antenna frequency path or antenna path. Antenna frequency paths differ by the transmission antenna, the receiver antenna and the frequency. Therefore with two transmitter antennas and two receiver antennas and two frequency components, 8 antenna frequency paths result. Particularly, the query node does not communicate in a dedicated manner with one single transponder for determining the hierarchy, but rather always with all transponders. In particular, all transponders, or only those that satisfy a requirement regarding a characteristic of the transponder, respond to a signal of the query node that demands a response from at least one transponder, wherein this requirement must encompass a plurality of transponders and/or satisfy a requirement based on a signal strength and/or signal quality of the received demand signal, particularly first query signal.

The determination of the hierarchy lasts particularly for a maximum of 1 ms, particularly the entire process for determining the hierarchy, including the exchange of the signals required therefor, lasts a maximum of 20 ms, particularly a maximum of 10 ms, particularly it spans at maximum a timespan of 20 ms, particularly a maximum of 10 ms.

The formation of the hierarchy or estimate of the distance particularly uses signals on a maximum per transponder of five different frequencies and/or a maximum of 5 signal cycles per transponder between the query node and transponder, and/or a maximum of 5 first responses of each transponder. Particularly the formation of the hierarchy or estimate of the distance uses no light, no laser, no inertia sensor, no GPS, no FFT, no Fourier transformation, and/or no linear algebra in multidimensional matrices. The formation of the hierarchy or estimate of the distance uses merely radio signals.

The estimate particularly permits the estimation of an absolute distance determination only with a precision of 1 m or worse, and/or the estimate is not suitable to determine results independently from the relative antenna polarization, and/or the estimate is not suitable for resolving multipath propagation.

transmitting one, particularly precisely one, second query signal from the query node, and transmitting at least one second response signal through at least one of the transponders of the partial quantity, wherein among the at least one transponder transmitting a second response signal, there is at least one which in a consideration wherein the highest place in the hierarchy is assigned by the smallest distance, has an upper, particularly the highest, place using the at least one second response signal, performing at least one, particularly precisely one, distance determination, wherein the first distance determination determines the determination of the distance between the query node or a preset point disposed geographically in a fixed manner and one of the transponders of the plurality, from which a second response signal was received and wherein in a consideration in which the highest place in the hierarchy is assigned by the lowest distance, has an upper, particularly the highest, place, In this context, the distance determination particularly has a higher precision, particularly at least by a factor of 2, particularly at least a factor of 5, particularly at least by a factor of 10, than the distance estimate, or a possible distance estimate on the basis of the at least one first query signal and/or of the at least one first response signal, or a distance estimate on the basis of the at least one first query signal and/or of the at least one first response signal, and/or of the value used, has a lower precision, particularly at least by a factor of 2 particularly at least a factor of 5, particularly at least a factor of 10, than the distance determination. In this context, the distance determination particularly has a higher computational overhead, particularly at least by a factor of 2, particularly at least a factor of 5, particularly at least by a factor of 10, than the distance estimate, or a possible distance estimate on the basis of the at least one first query signal and/or of the at least one first response signal, or a distance estimate on the basis of the at least one first query signal and/or of the at least one first response signal, and/or of the value used, has a lower computational overhead, particularly at least by a factor of 2 particularly at least a factor of 5, particularly at least a factor of 10, than the distance determination. Also, more measured values of response signals, particularly at least by a factor of 2, particularly at least a factor of 5, particularly at least by a factor of 10 can be taken into account for the distance determination.

The higher precision can be reached, for example, by a more precise calculation, which for example takes multipathing or more comprehensive signal propagation techniques into account.

The distance determination to a first transponder is particularly based on at least a second response signal, particularly on a multiplicity of second response signals of the first transponder, particularly it rests additionally on at least one measurement data signal of the first transponder and/or additionally on at least one radio signal transmitted from the query node to the first transponder, particularly query signals, particularly additionally on at least a multiplicity of radio signals transmitted by the query node to the first transponder, particularly a multiplicity of query signals. It is not necessary, however, for the distance measurement to use the second query signal. It can also use one or more signals transmitted from the query node to the first transponder and/or the transponders following one or respectively, a second, response signal.

In this context, the multiplicity of transponders comprises at least two, particularly at least three, particularly authorized transponders, that particularly receive all of the query signals, and/or transmit first and/or second response signals.

Advantageously at least one additional distance determination is performed after the at least one first distance determination, particularly only if the certain distance exceeds a predetermined distance and/or lies outside a predetermined distance range. In another embodiment, additional distance determinations can also be performed to obtain therefrom information for an improvement of subsequent hierarchy determinations. Particularly however, a release or granting of access is not delayed thereby.

Advantageously, an action is performed once a certain distance does not exceed the predetermined distance and/or lies within the predetermined distance range, particularly a decision made, a release effected, or an access granted. Preferably the first distance determination determines the distance between the query node and one of the transponders of the plurality, which in a consideration in which the highest place in the sequence is assigned based on the smallest distance, has the highest place Preferably the at least one additional distance determination determines the distance between the query node and one of the transponders of the plurality, which in a consideration in which the highest place in the hierarchy is assigned by the smallest distance, wherein the highest place in the hierarchy is assigned by the lowest distance, has a lower place than the transponders considered in the first and/or previous distance determination, and wherein this procedure is particularly repeated until the distances from the query node to all transponders of the plurality or of the sequence are determined, or the certain distance to one of the transponders does not exceed a predetermined distance, and/or lie within a predetermined distance range. Thus the distance to a plurality of transponders can be determined consecutively, wherein the determination takes place in the sequence of decreasing probability that the predetermined distance is not reached.

Advantageously, the hierarchy/sequence establishes the sequence of a signal transmission, particularly of all signal transmissions, from the transponder to the query node, and/or the sequence of the distance determinations, and/or the sequence of the calculations required for the distance determination. In this context, the determination of the sequence of the signal transmission, particularly of all signal transmissions, from the transponder to the query node can occur such that said sequence is established for every signal type or for all signal types. Thus the transponders can transmit a second response signal in this sequence, for example, and then a measurement data signal in this sequence. The sequence can be established by an assignment of the query node, for example, can be predetermined, can follow from the IDs in a predetermined manner, and/or can be determined and/or controlled in another known manner. For example, the query node can announce the hierarchy of the transponders, and/or the transponders can also listen in to the responses of other transponders and thereby determine when they themselves are next.

Advantageously, the procedure is that a signal is transmitted from the query node to the transponder, wherein the signal is particularly the second query signal, from which the hierarchy is to be taken, and/or wherein the transponders, particularly only those included in the hierarchy, successively transmit a second response signal and/or measurement data signal depending on their respective place, particularly in the sequence of the hierarchy, particularly with decreasing places. Thus, for example, the transponders can transmit a second response signal in this sequence, and then a measurement data signal in this sequence.

Advantageously, in a first response phase following the initially transmitted second query signal, particularly with a duration in the range from 2 to 200 ms, respectively at least one, particularly a plurality of second response signals, particularly respectively following a second query signal, are transmitted by at least one, particularly each of the transponders contained in the hierarchy. Advantageously, in a second response phase, particularly following the first response phase, particularly with a duration in the range from 1 to 200 ms, particularly up to 50 ms, respectively one measurement data signal is transmitted by at least one, particularly each of the transponders contained in the hierarchy, wherein the sequence defined by the hierarchy among the transponders is maintained in the first and/or second response phase, and/or wherein in a consideration in which the highest place in the hierarchy is assigned by the smallest distance, the transponders transmit in the order of decreasing places in the hierarchy.

Advantageously, the duration from the beginning of a first query signal to the end of a first response signal, particularly directly following, of a transponder is in the range form 2 ps to 2 ms.

Advantageously the duration from the beginning of a first query signal to the end of, respectively, a first response signal of all, of a plurality, or at least of three transponders is in the range from 4 ps to 5 ms.

Advantageously the duration from the beginning of a second query signal to the end of a, particularly directly following, second response signal of a transponder is in the range from 2 ps to 2 ms. Advantageously the duration from the beginning of a second query signal to the end, respectively of a second response signal of all, of a plurality, or of at least three transponders is in the range of 4 ps to 5 ms.

It is especially advantageous to proceed such that after a maximum of 200 ms following transmission of the initially transmitted first or second query signal from at least one transponder, all data for the at least one distance determination are available.

The method can also be designed such that a plurality of second response signals and/or measurement data signals are transmitted from one, from a plurality of, or from all transponders, however this is not preferred.

It can also be that the transmission of the second query signal and of the second response signal and/or measurement data signals is repeated, if applicable also with different second query signals and/or different second query signals, particularly on the basis of already exchanged second query signals and/or second measurement data signals of improved and/or modified hierarchies. Preferably a plurality of a round of second query signals and/or second response signals is used. The corresponding measurement value data can be transmitted in a single second measurement data signal per transponder, however they can also be split up into a plurality.

Advantageously, the measurement data signal contains at least one phase information, for example PCT (phase correction term) and/or phase correction information and/or phase deviation information and/or frequency information and/or time correction information, wherein the information sheds light particularly on how a signal received at the transponder by the query node and a signal transmitted by the transponder to the query node differ in terms of phase and/or frequency and/or time at the query node. Particularly, the measurement data signal supplies the information required for the distance determination and that cannot be determined by the query node itself and is not predetermined. It therefore enables the query node to perform the distance determination together with the second response signal. Although it is also possible to partially or completely integrate the measurement data signal into the second response signal, at least complete integration is not preferred, however. Rather, it is preferred to collect initially short second response signals, particularly with a respective length in the range from 50 to 500 ps.

The first and/or second query signals and/or first and/or second response signals have a respectively length particularly in the range from 50 to 500 ps ms.

Conversely, the measurement data signal has particularly a length in the range from 1 to 200 ms, particularly up to 50 ms, wherein the length of each measurement data signal is particularly larger than that of each of the lengths of the first and/or second response signals considered individually.

In this context, frequencies particularly in the range of 2400 to 2499 MHz are used.

Advantageously, the determination of the hierarchy takes places, particularly exclusively, based on the first response signals and coordinations and/or synchronizations performed between coordination nodes and transponders, or signals transmitted for this purpose, particularly for coordination and/or synchronization of frequency and/or time, which are particularly transmitted from the query node between the first query signal and first response, or exclusively based on the first response signals. For the determination of the hierarchy, particularly no determination of an absolute distance or round trip time is performed. Particularly a maximum of six, particularly a maximum of four signals are exchanged between the query node and transponder per transponder, and this occurs particularly in rapid succession, particularly for this purpose a maximum of two, particularly only one, signal is transmitted from each transponder to the query node.

Advantageously, the calculations performed for the distance estimate and/or distance determination are predominantly, particularly exclusively, performed in the query node or a unit fixedly connected thereto, and/or on the basis of the response signals and measurement data signals and measurements of the query node transmitted to the query node, as well as predetermined characteristics of the transponders or characteristics of the transponders set by the query node.

Advantageously, the query node and the transponders are wireless participants of a standardized chip and/or symbol synchronized wireless network, for example Bluetooth, particularly from version 5.0, and/or with respect to the signals, particularly the first and/or second query signal, the first and/or second response signals and/or the measurement data signals are signals of a standardized wireless network, for example Bluetooth, particularly from Version 5.0, and/or are signals in which information is digitally encoded in symbols and/or chips, an/or they are symbol and chip synchronized signals.

Advantageously a transmission power and gain adjustment of the transponder that is to transmit the first response signal is performed before transmission of a first response signal, particularly the adjustment is performed such that a preset power is not exceeded, insofar as possible, upon reception at the query node. This is performed particularly for all transponders that transmit a first response signal.

Advantageously, the transmission power or gain adjustment is used for distance estimation and/or to determine the hierarchy.

Advantageously, a frequency determination and/or coordination is performed before the distance determination.

Particularly at least one transmission frequency of the transponder is adjusted to at least one frequency of the query node, particularly with a precision of 10000 Hz or better, or in the range from 50 to 10000 Hz. Such a frequency adjustment is particularly not performed for the determination of the hierarchy or distance estimate, particularly no frequency adjustment is performed for this purpose.

Advantageously, the determination of the hierarchy is performed on the basis of signal strength, a signal/noise ratio, and/or RSSI of the first response signals, and/or of the transmission power and/or gain adjustment of the first response signals. Particularly the first and/or second response signals are respectively transmitted via a plurality of antenna paths, particularly with a plurality of transmission antennas of the respective transponder and/or a plurality of reception antennas of the query node.

Advantageously, the distance determination is performed by means of phase-based distance measurement and/or time of flight measurement and/or round trip time measurement. Advantageously, the determination of the hierarchy is not performed by means of phase-based distance measurement and/or not by means of time of flight measurement and/or round trip time measurement.

Preferably the value used for the distance estimate contains at least one RSSI, particularly determined for a plurality of frequencies and/or plurality of antenna paths of a transponder. The value can be given thereby. The hierarchy is particularly determined by this value for each transponder. The determination of the sequence can also take into account other measurements based on other physical phenomena, for example motion sensors, light sensors, or others, however this is not preferred.

Advantageously, the wireless signals of the query node and/or of the transponder are received additionally spatially removed from the query node and its at least one antenna, particularly with a distance in the range from 0.01 m to 30 m from the query node and its at least one antenna, and wherein the signals received in this manner are taken into account in the formation of the hierarchy and/or the determination of the distance.

The advantageous embodiments described can also be applied to the following solutions, the system can particularly contain a control apparatus that is designed for performing the corresponding method or method portion. However, the embodiments described in the following can also be realized in the method according to the invention.

The object is also solved by a distance threshold decision method for deciding whether at least one transponder exceeds one, particularly predetermined, distance and/or lies outside of a, particularly predetermined, distance range, wherein the decision rests on at least one distance determination according to the invention. Particularly the decision is made solely on the basis of the distance determination. The decision is made particularly such that the transponders exceeds the predetermined distance and/or lies outside if the determined distance exceeds the, particularly predetermined, distance or lies outside of the, particularly determined, distance range.

The decision is made particularly such that the transponder does not exceed the predetermined distance and/or lie within once a certain distance does not exceed the, particularly predetermined, distance or lies within the, particularly predetermined, distance range. The object is also solved by a distance threshold decision method for deciding whether at least one transponder does not exceed a, particularly predetermined, distance and/or lies within a, particularly predetermined, distance range, wherein the decision rests on at least one distance determination according to the invention. The decision is particularly made such that the transponder does not exceed the, particularly predetermined, distance and/or lie within it once a certain distance does not exceed the, particularly predetermined, distance or lies within the, particularly predetermined, distance range.

The object is also solved by a method for deciding on a release, wherein at least one distance between a query node and an authorized transponder is determined for a plurality of, particularly authorized, transponders, and wherein the release occurs and/or is not refused once a certain distance between the at least one antenna of the query node to an authorized transponder does not exceed a predetermined distance an/or lie within a predetermined distance range, wherein the distance threshold decision and/or the determination of the at least one distance occurs according to one of the preceding claims.

The object is also solved by a radio authorization system having at least one query node with at least one antenna, configured for serving an access restriction means, particularly an access restriction apparatus, in dependence upon the distance of at least one transponder of a plurality of transponders, particularly authorized transponders, particularly to the query node or at least to one antenna of the query node. A transponder is authorized particularly when it is capable of effecting a release, particularly opening, by means of the query node. This can be realized by an ID of the transponder, a key stored on the transponder, or a function stored on the transponder.

In this context, the radio authorization system is configured for:
- transmitting at least one, particularly precisely one, first query signal from the query node and receiving respectively one, particularly respectively precisely one, first response signal from at least two of the plurality of transponders, particularly from each of the transponders of the plurality that receives the first query signal and does not establish by other measures that it does not satisfy requirements known to it, and
- determining a hierarchy of a partial quantity of the plurality of transponders on the basis of the response signals, wherein the places of the transponders in the hierarchy is determined by an estimated distance or at least one value that can be and/or is used for a distance estimate, wherein the value is derived and/or calculated, particularly exclusively, from the response signal of the respective transponder received at the query node, and
- transmitting at least one, particularly a multiplicity, of second query signal(s) from the query node and receiving at least one second response signal from at least one of the transponders of the partial quantity, wherein of the at least one second response signal, at least one is from a transponder that in a consideration in which the highest place in the hierarchy is assigned to the lowest distance, has a higher, particularly the highest, place, and is configured to perform at least one, particularly precisely one, first distance determination using the at least one second response signal, wherein the first distance determination determines the determination of the distance between the query node and one of the transponders of the plurality from which a second response signal was received and which in a consideration in which the highest place in the hierarchy is assigned by the lowest distance, has a higher, particularly the highest, place, wherein the radio authorization system is configured to perform the distance determination with a higher precision than the distance estimate or a distance estimate, and wherein the plurality is composed of at least two, particularly at least three.

An upper place in the hierarchy is particularly such a place in the upper half of the hierarchy, particularly in the upper third thereof.

In this context, the radio authorization system is designed particularly such that the distance determination particularly has a higher precision than the distance estimate, particularly at least by a factor of 2, particularly at least a factor of 5, particularly at least by a factor of 10, or that a distance estimate on the basis of the first query signal and the first response signals and/or of the value used has a lower precision than the distance determination, particularly at least by a factor of 2, particularly at least a factor of 5, particularly at least by a factor of 10.

In this context, the radio authorization system has at least one access restriction means, particularly an access restriction apparatus, wherein the access restriction means is configured to grant and/or refuse access, particularly by means of an access restriction means, wherein the access restriction means is configured not to refuse the access and/or to grant the access once the at least one determined distance between the at least one antenna of the query node to an authorized transponder does not exceed a predetermined distance and/or lies within a predetermined distance range, and/or to refuse the access and/or not grant the access if the at least one, particularly all, determined distance(s) between the at least one antenna of the query node to an authorized transponder exceeds the predetermined distance and/or lies outside the predetermined distance range.

The access restriction apparatus can be, for example, a barrier or wall with one door or one gate. It can also have only one door with a lock, however. The access restriction means can be a lock, for example. The access restriction means can also be protection of a function, and/or a SICH-ERUNG of a digital entry. The access restriction means can then also be realized virtually. Thus, for example, the execution of a function can be protected by the system containing the function, so that its execution is only possible after an authentication, this authentication can comprise or be given through the presence of a transponder, particularly an authorized transponder, within a predetermined distance. It can additionally demand the input of a password, for example.

The radio authorization system particularly comprises the plurality of transponders, particularly of authorized transponders. In this context, the transponders are configured particularly to transmit the first and the second response signal, particularly also the measurement data signal. The transponders are particularly configured for carrying out the method steps described for the transponder. They are configured particularly for cooperating with the query node, particularly within the scope of a method according to the invention.

Advantageously, the radio authorization system contains at least one MITHOER node with at least one MITHOER antenna spaced from the query node and/or its at least one antenna, particularly with a distance in the range from 0.1 to 5.0 m, wherein the radio authorization system is configured to receive and process the signals exchanged between the query node and transponders, and the radio authorization system is configured to take into account a [x] received or processed by at least one MITHOER node in the determination of the hierarchy and/or the determination of the distance. This can increase the precision and/or speed. In principle, it is one alternative for designing the query node with a plurality of antennas, wherein these measures can also be used in combination.

The methods according to the invention are carried out particularly by means of an apparatus according to the invention. Apparatus according to the invention are configured particularly to carry out at least one method according to the invention.

BRIEF DESCRIPTION OF THE DRAWINGS

The following, description given purely as an example of the figures, which are purely examples and schematic, contributes toward improved understanding of the invention. They show.

DETAILED DESCRIPTION

Figure 1:
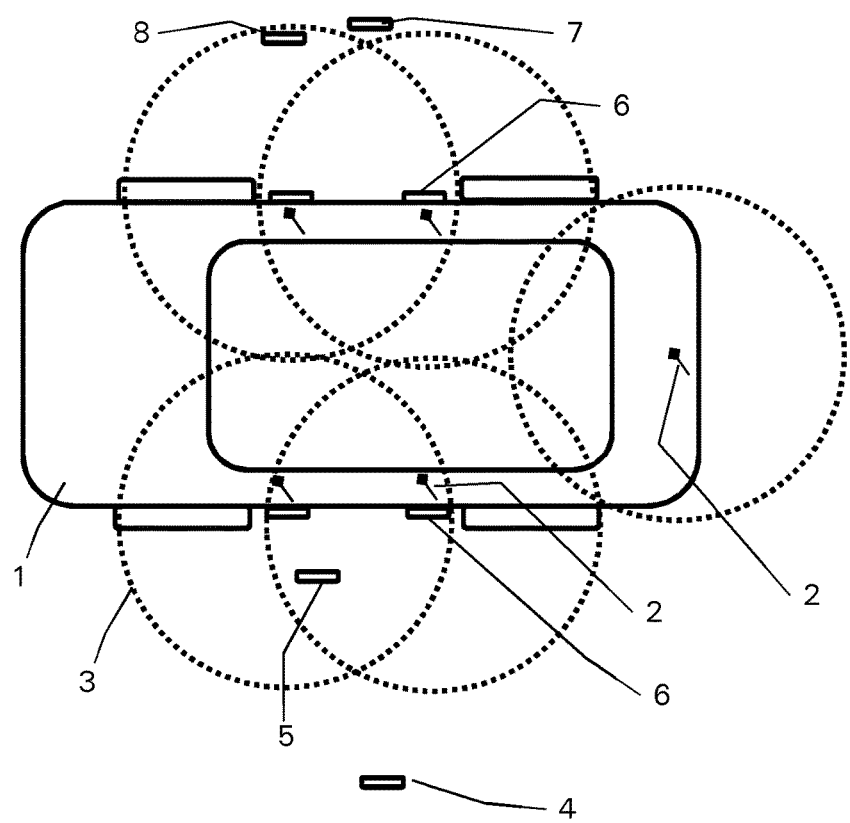
FIG. 1 an illustration of the invention in the scope of an automotive locking system, and FIG. 2 an illustration of the sequence of the signal exchange and of the calculations in the system from FIG. 1.

FIG. 1 shows a view of an automobile 1 from above, antennas 2 are disposed next to the door and trunk latches. Also apparent are additional authorized fobs (transponders) 4, 5, 7, B for opening. Moreover, predetermined distance thresholds 3 around the antennas 2 are shown by dashed circles.

Figure 2:
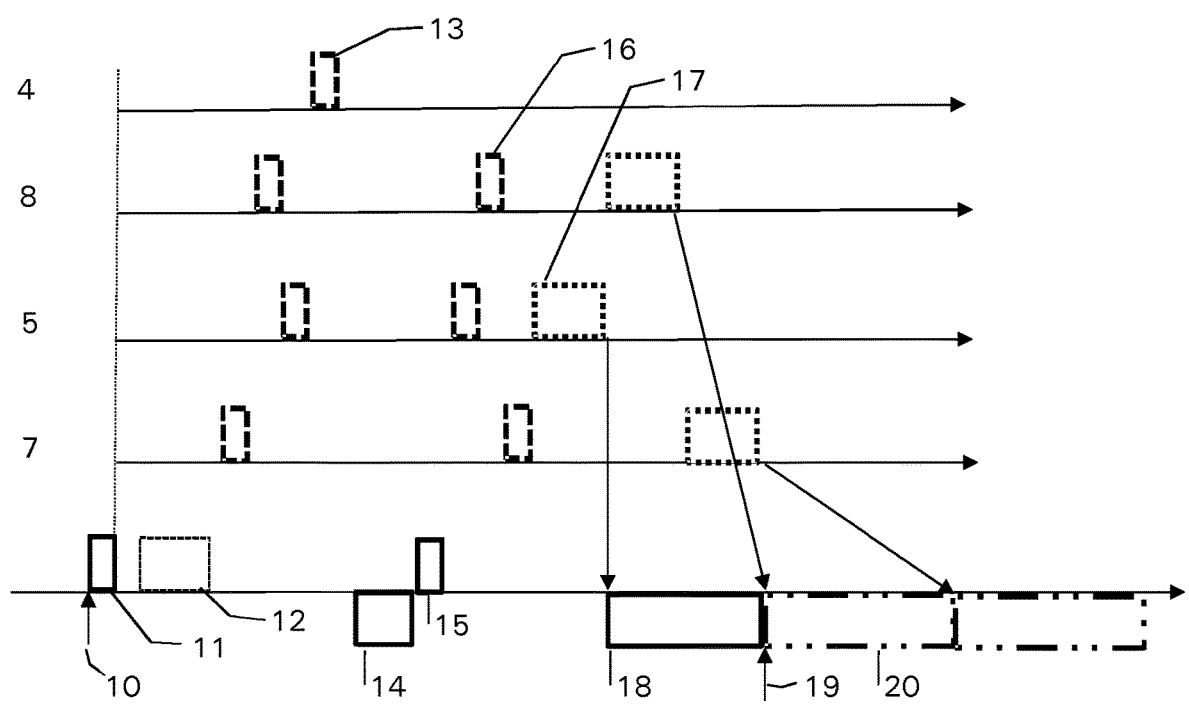

Below, as a timeline, FIG. 2 shows the time in the query node of the automobile that is connected to all five antennas 2. Above these, timelines of the fobs 4, 5, 7 and 8 are shown. Actions of the query node and the transponder are illustrated in the timelines. If the automobile or electronics contained therein detect, for example by capacitive sensors, an approach, for example, of a hand, at a door latch 6, as indicated by the arrow 10, the query node transmitted a first query signal 11 via one or more of its antennas, from which a time synchronization and particularly a response sequence can advantageously be derived by the transponder. Moreover, preferably an additional signal 12 is transmitted by the query node, particularly with a continuous carrier wave, that enables a certain frequency adjustment for the fobs to the frequency of the query node. This signal is not actually advantageous for the distance estimate, however it is advantageous to transmit this signal already in this phase in order to give the fobs a time period for frequency adjustment before the subsequent distance determination. Thereafter the fobs respectively transmit a first response signal 13 sequentially. Different than the example, additional first query signals and/or first response signals can occur thereafter.

These response signals are used for distance estimation and hierarchy formation 14 in the query node. Thereafter the query node transmits a second query signal 15, from which preferably the new reply sequence and/or selection is apparent. In this example, the query node has the sequence 5, 8, 7. In this example, the fobs each respond with a second response signal 16 and thereafter with measurement value signals 17.

Different than in this example, additional second query signals and/or second response signals can follow thereafter.

Once the data of the first fobs in the hierarchy is available, the determination of the distance 18 to the fob begins. Depending on the embodiment, a part of the determination can even occur as early as following reception of the second response signal 16 of the fob, here fob 5. Additional distance determinations 20 to other fobs can follow the first distance determination. However, to the extent that the first distance is within the predetermined distance threshold 3, which is the case here, the door lock is opened, which is indicated by the arrow 19. The additional determinations 20 can then be dispensed with.

LIST OF REFERENCE SYMBOLS 1 automobile
2 antenna
3 permissible distance
4 first fob
5 second fob
6 door latch
7 third fob
8 fourth fob
10 beginning of the method/approach
11 first query signal and time synchronization signal
12 frequency coordination signal
13 first response signal
14 hierarchy determination
15 second query signal
16 second response signal
17 measurement data signal PCT)
18 calculation of the distance to fob 5
19 door lock opening
20 calculation of the distance to fob 8
21 calculation of the distance to fob 7

The invention claimed is:

1. A method for determining at least one distance of at least one transponder of a plurality of transponders to a query node or to a predetermined point disposed in a geographically fixed manner thereto, wherein the plurality of transponders has at least two transponders;
said method comprising the following steps:
transmitting one first query signal from the query node, and transmitting one first response signal by at least two of the plurality of transponders;
carrying out a distance estimation for estimating an estimated distance using the first response signal received at the query node, or deriving or calculating at least one value correlated to the estimated distance from the first response signal received at the query node;
determining a hierarchy of at least a partial quantity of the plurality of transponders on the basis of the first response signal, wherein places of the plurality of transponders in the hierarchy are determined by the estimated distance with a highest place in the hierarchy being assigned to a lowest estimated distance, or wherein the places of the plurality of transponders in the hierarchy are determined by the at least one value correlated to the estimated distance with the highest place in the hierarchy being assigned to the at least one value correlated to the estimated distance corresponding to a lowest distance; and
transmitting one second query signal from the query node, and transmitting at least one second response signal by at least one of the transponders of the partial quantity of the plurality of transponders, wherein among the at least one transponder transmitting the at least one second response signal, at least one is such that has an upper place in the hierarchy, and
carrying out at least one first distance determination using the at least one second response signal, wherein the at least one first distance determination determines the distance between the query node and the at least one of the transponders of the plurality of transponders from which the second response signal was received and that has the upper place in the hierarchy, wherein the at least one first distance determination has a higher precision than the distance estimate or an estimation of the distance on the basis of the first query signal or on the basis of the first response signal.

2. The method according to claim 1, wherein following the at least one first distance determination when the determined distance exceeds a predetermined distance, or lies outside of a distance range, at least one additional distance determination is carried out, wherein the at least one additional distance determination determines the distance between the query node or the predetermined point disposed in the geographically fixed manner thereto and the one of the transponders of the plurality which in a consideration in which the highest place in the hierarchy is assigned by the lowest distance, has a lower place than the transponder considered in the at least one first distance determination, and wherein this procedure is repeated until the distances from the query node or the predetermined point disposed in the geographically fixed manner thereto to all transponders of the plurality of transponders or of the hierarchy are determined, or the determined distance to one of the transponders does not exceed the predetermined distance, or lies within the distance range.

3. The method according to claim 1, wherein the hierarchy establishes a sequence of a signal transmission of the at least one transponder to the query node or a sequence of first distance determinations between the query node or the predetermined point disposed in the geographically fixed manner thereto and the plurality of the transponders, or the sequence of calculations necessary for the first distance determinations.

4. The method according to claim 1, wherein the second query signal transmitted from the query node to the transponders contains information on the hierarchy or wherein the transponders included in the hierarchy sequentially transmit a second response or measurement data signal in a sequence depending on their respective place in the hierarchy, wherein the sequence defined by the hierarchy is maintained among the transponders in a first response phase or a second response phase, or wherein the transponders transmit in a sequence of decreasing hierarchy place.

5. The method according to the preceding claim 4, wherein the measurement data signal contains at least one phase information or phase correction information or phase deviation information or frequency information or time correction information, wherein the information indicates how the signal received at the transponder from the query node, and the signal transmitted from the transponder to the query node, differ in terms of phase or frequency or time at the query node.

6. The method according to claim 1, wherein all transponders of the plurality of transponders that receive the first query signal respond to the first query signal, or wherein the determination of the hierarchy is based on the first response signal and alignments or synchronizations carried out between query node and the plurality of transponders, or wherein calculations carried out for distance estimation or distance determination are predominantly performed by the query node or on basis of the response or measurement data signals transmitted to the query node and measurements of the query node, as well as predetermined characteristics of the transponders or characteristics of the transponders set by the query node.

7. The method according to claim 1, wherein before carrying out the distance estimate estimation, a frequency determination, alignment or gain determination or synchronization is carried out on at least two of the plurality of transponders, on signals of at least two of the plurality of transponders, or between the query node and at least two of the plurality of transponders, or insights gained therefrom are used for the distance estimate.

8. The method according to claim 1, wherein the determination of the hierarchy occurs on the basis of signal strengths or RSSI of the first response signals or wherein the at least one first distance determination occurs by means of phase-based distance measurement or time of flight measurement or round-trip time measurement between the query node and the at least one transponder, wherein phases or times are collected prior to the at least one first distance determination.

9. The method according to claim 1, wherein the at least one value used for estimating an estimated distance contains at least one RSSI.

10. The method according to claim 1, wherein the first or second query signals of the query node or the first or second response signals of the transponders are received in a spatially distanced manner from the query node by at least one antenna spatially distanced from the query node, and wherein the first or second query signals or the first or second response signals received in such a manner are taken into account in while forming the hierarchy or determining the distance.

11. A distance threshold decision method for deciding whether at least one transponder exceeds a predetermined distance to a query node or to a predetermined point disposed in a spatially fixed manner thereto or lies outside a predetermined distance range, wherein the decision is based on at least one distance determination according to claim 1.

12. A method for deciding on an approval, wherein at least one distance between a query node or at least one antenna of the query node or a predetermined point disposed in a spatially fixed manner thereto and an authorized transponder of a plurality of transponders is determined and wherein the approval occurs or is not refused when the at least one determined distance between the query node or at least one antenna of the query node or the predetermined point does and the authorized transponder does not exceed a predetermined distance or lies within a predetermined distance range, wherein a distance threshold decision occurs according to claim 11 and wherein the authorized transponder is a transponder that was previously registered with the query node or which has an identifier known to the query node.

13. Method according to claim 1, further comprising transmitting a multitude of second response signals.

14. Method according to claim 1, wherein among the at least one transponder transmitting the at least one second response signal, at least one is such that has a highest place in the hierarchy.

15. Method according to claim 1, wherein respectively one measurement data signal is transmitted in a first response phase following a second query signal, and respectively one measurement data signal is transmitted in a second response phase following the first response phase.

16. Method according to claim 1, wherein, for the round trip time measurement between the query node and the at least one transponder, the necessary measurement values including phases or times are collected beforehand based on the first or second query signals or the first or the second response signals.

17. Method according to claim 1, wherein the at least one value used for the distance estimate contains at least one previously determined RSS determined on a plurality of frequencies or a plurality of antenna paths, containing antenna paths that were used or will be used for transmitting the first or second query signals or the first or second response signals.

18. Method according to claim 1, wherein the signal strength, the phase, the cycle time or the RSSI of the first or second query signals or the first or second response signals are taken into account in forming the hierarchy or determining the distance.

19. A wireless authorization system having at least one query node with at least one antenna, configured for operating an access restriction means, which is closed or activated in dependence upon the distance of at least one transponder of a plurality of transponders to the query node or to at least one antenna of the query node or to a predetermined point disposed in a geographically fixed manner thereto, wherein the plurality of transponders has at least two transponders; the wireless authorization system is being configured for:
    transmitting one first query signal from the query node and receiving respectively one first response signal from at least two of the plurality of transponders;
    carrying out a distance estimation for estimating an estimated distance using the first response signal received at the query node, or deriving or calculating at least one value correlated to the estimated distance from the first response signal received at the query node;
    determining a hierarchy of at least a partial quantity of the plurality of transponders on the basis of the first response signals, wherein places of the transponders in the hierarchy are determined by the estimated distance with a highest place in the hierarchy being assigned to a lowest estimated distance, or wherein the places of the transponders in the hierarchy are determined by the at least one value correlated to the estimated distance with the highest place in the hierarchy being assigned to the at least one value correlated to the estimated distance estimate corresponding to a lowest distance; and
    transmitting a second query signal from the query node and receiving at least one second response signal from at least one of the transponders of the partial quantity of the plurality of transponders, wherein among the at least one second response signal, at least one is from a transponder that has an upper place in the hierarchy and is configured to carry out at least one first distance determination using the at least one second response signal;
    wherein the at least one first distance determination determines the distance between the query node or the at least one antenna of the query node or the predetermined point disposed in a spatially fixed manner thereto, and the transponder of the plurality of transponders from which the second response signal was received and that has the upper place in the hierarchy;
    wherein the wireless authorization system is configured to carry out the at least one first distance determination with a higher precision than the distance estimate or a distance estimation based on the at least one first query signal or based on the at least one first response signal; and
    wherein the wireless authorization system is configured to grant or refuse an access or to operate the access restriction means including to activate, deactivate, to open, to close or to remove the access restriction means, and wherein the wireless authorization system is configured to not refuse the access or grant the access, deactivate, open or remove the access restriction means once a determined distance does not exceed a predetermined distance or lies within a predetermined distance range, or wherein the wireless authorization system is configured to refuse the access or not grant the access and to activate or close the access restriction mean if the at least one determined distance between the query node or the at least one antenna of the query node or the predetermined point exceeds the predetermined distance or lies outside the predetermined distance range.

20. The wireless authorization system according to claim 19, comprising the plurality of transponders.

21. The wireless authorization system according to claim 19, having at least one listening node with at least one listening antenna, said listening node being spaced from the query node or at least one antenna of the query node, wherein the wireless authorization system is configured to receive and to process signals exchanged between the query node and the plurality of transponders, and the wireless authorization system is configured to take into account at least one first response signal received or processed by at least one listening node for the determination of the hierarchy, or to take into account at least one second response signal received or processed by at least one listening node for the determination of the distance.

* * * * *